(12) United States Patent
Ryan

(10) Patent No.: US 7,401,435 B1
(45) Date of Patent: Jul. 22, 2008

(54) LURE LATCHING SYSTEM

(76) Inventor: Tim D. Ryan, 1678 14 Rd., Loma, CO (US) 81524

( * ) Notice: Subject to any disclaimer, the term of this patent is extended or adjusted under 35 U.S.C. 154(b) by 0 days.

(21) Appl. No.: 11/496,292

(22) Filed: Jul. 31, 2006

Related U.S. Application Data

(60) Provisional application No. 60/704,311, filed on Aug. 1, 2005.

(51) Int. Cl.
*A01K 97/06* (2006.01)
(52) U.S. Cl. .................................................. 43/57.1
(58) Field of Classification Search ............... 43/57.1, 43/54.1; 206/315.11
See application file for complete search history.

(56) References Cited

U.S. PATENT DOCUMENTS

| | | | |
|---|---|---|---|
| 2,826,853 A * | 3/1958 | Guy et al. .................. | 43/42.06 |
| 4,033,648 A | 7/1977 | Lopez-Cepero | |
| D262,132 S | 12/1981 | McHugh | |
| 4,366,641 A | 1/1983 | Price et al. | |
| 4,383,385 A * | 5/1983 | Myers ........................ | 43/57.1 |
| 4,577,433 A | 3/1986 | Jones | |
| 4,681,220 A * | 7/1987 | Beneke .................. | 206/315.11 |
| 5,440,829 A * | 8/1995 | Parvin ....................... | 43/57.1 |
| 5,533,297 A * | 7/1996 | Crosby ...................... | 43/57.1 |
| 5,606,820 A | 3/1997 | Suddeth | |
| 5,755,057 A * | 5/1998 | Dancer ...................... | 43/54.1 |
| 6,530,488 B1 | 3/2003 | Krammes, Jr. | |
| D475,852 S | 6/2003 | Peterson | |
| 6,962,020 B2 * | 11/2005 | Gonzalez ................... | 43/57.2 |

FOREIGN PATENT DOCUMENTS

JP 05276852 A * 10/1993

* cited by examiner

*Primary Examiner*—Kimberly S Smith
(74) *Attorney, Agent, or Firm*—Robert C. Montgomery

(57) ABSTRACT

The present invention comprises an apparatus to aid in the storage, display, and transportation of fishing lures. A conventional glass bottle or jar has lure retaining notches for receiving the lure hooks around the periphery of the opening of the bottle or jar for the retention of said lures. A lid with an extruding lip portion is also provided to aid in retaining said lures and protecting the user from accidental impairment with the lure hook.

4 Claims, 5 Drawing Sheets

LURE LATCHING SYSTEM

RELATED APPLICATIONS

The present invention was first described in U.S. Provisional Patent No. 60/704,311 filed on Aug. 1, 2005.

FIELD OF THE INVENTION

The present invention generally relates to fishing lure hook retainers and, more particularly, relates to a transparent lure latch for storing, displaying and transporting fishing lures.

BACKGROUND OF THE INVENTION

A great number of people around the world enjoy fishing. Whether fishing for food or for the sport of it, the calmness and serenity of the sport, coupled with the excitement of landing the big one, makes fishing a popular pastime. However, the tranquility of the pastime is quickly destroyed when dealing with tangled lures. This tangling is especially common when lures are stored with the fish hooks attached. In fact, many experts recommend removing the hooks when storing lures. However, the time spent removing and re-attaching hooks to lures may be as great as or greater than untangling them. While this wasted time is certainly stressful when fishing for relaxation, it can also mean the difference between winning and losing in a fishing contest.

Several attempts have been made in the past to assist individuals in transporting and storing lures with attached fish hooks in a tangle-free environment. U.S. Pat. No. 6,530,488 issued in the name of Krammes, Jr. provides for a fishing lure storage and display apparatus comprising transparent storage receptacles releasably suspended from a hanging rod. The Krammes, Jr. invention differs from the present invention in that it doesn't completely envelope the lures it is protecting.

U.S. Pat. No. 4,366,641 issued in the name of Price et al. discloses a fishing lure container and transporter, which is essentially a caddy with tubular compartments rotatably surrounding a core. The Price et al. device is bulkier and designed to retain multiple tubular containers on a central core that is rotatably selectable and is therefore not in the scope of the present invention.

U.S. Pat. No. 4,033,648 issued in the name of Lopez-Cepero describes a fishing lure rack mounted to an interior location of a boat consisting of lure hook retainers and a pivotable cover for protecting the hook portions. This device must be mounted to a vertical wall and does not completely enclose the lure and hook in a transparent container and therefore differs from the present invention.

U.S. Pat. No. 5,606,820 issued in the name of Suddeth describes a tangle-free fishing lure storage container including a plurality of compartments with lure retaining slots on two pivoting lure panels disposed in a carrying case. The Suddeth device is designed to carry a multitude of fishing lures in a carrying case instead of a transparent jar and is not suited for carrying a small number of lures as in the present invention.

U.S. Pat. No. 4,577,433 issued in the name of Jones discloses a compact fishing lure and leader holder comprising rigid fiberglass pages contained within a looseleaf binder. The Jones invention, transported and stored in a similar manner to the Suddeth device, differs from the present invention as well.

Other designs have evolved to provide a means for preventing the entanglement of fishing lures that differ in scope and function from the present invention. Such designs include U.S. Pat. No. D475,852 issued in the name of Peterson and U.S. Pat. No. D262,132 issued in the name of McHugh.

Accordingly, there exists a need for a means by which fishing lures can be stored with their hooks attached in a quick, easy and effective manner.

SUMMARY OF THE INVENTION

In view of the foregoing disadvantages inherent in the prior art, it has been observed that there is need of a device to secure fishing lure hooks in a safe, tangle-free, and easily accessible manner.

It has further been observed that there is a need for a device that secures fishing lure hooks in a transparent and easily transportable storage container.

Therefore it is an object of the present invention to obviate the above and other disadvantages and aggravations from existing art.

Another object of the present invention is to provide a transparent container with a plurality of "S"-shaped notches formed about the opening periphery and extending downwardly to securely retain fishing lure hooks therein.

Yet another object of the present invention is to provide a flanged lid device for threaded connection to the container opening to protect the fishing lure hooks from damage as well as inadvertent snagging on a person or other material.

Still yet another object of the present invention is to provide a handle formed thereof or connected thereto the outer surface of the container to aid in carrying and transporting said secured fishing lures within said container.

To achieve the above and other objectives, the present invention provides a lure latching system for storing, displaying and transporting lures comprising a first transparent cylindrical shaped jar tapering to a second transparent cylindrically-shaped body with an opening, the second cylindrically-shaped body having a fastening mechanism on its periphery; a plurality of equidistantly spaced lure-retaining notches extending downwardly through said fastening mechanism within the second cylindrical shaped body; the equidistantly spaced lure-retaining notches are configured to receive hook-suspending lures, a lid with a diameter larger than the cylindrical shaped jar and having a fastening mechanism therein capable of coupling to the fastening mechanism of the second cylindrically-shaped body, thereby covering the cylindrically-shaped jar and storing and displaying lures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
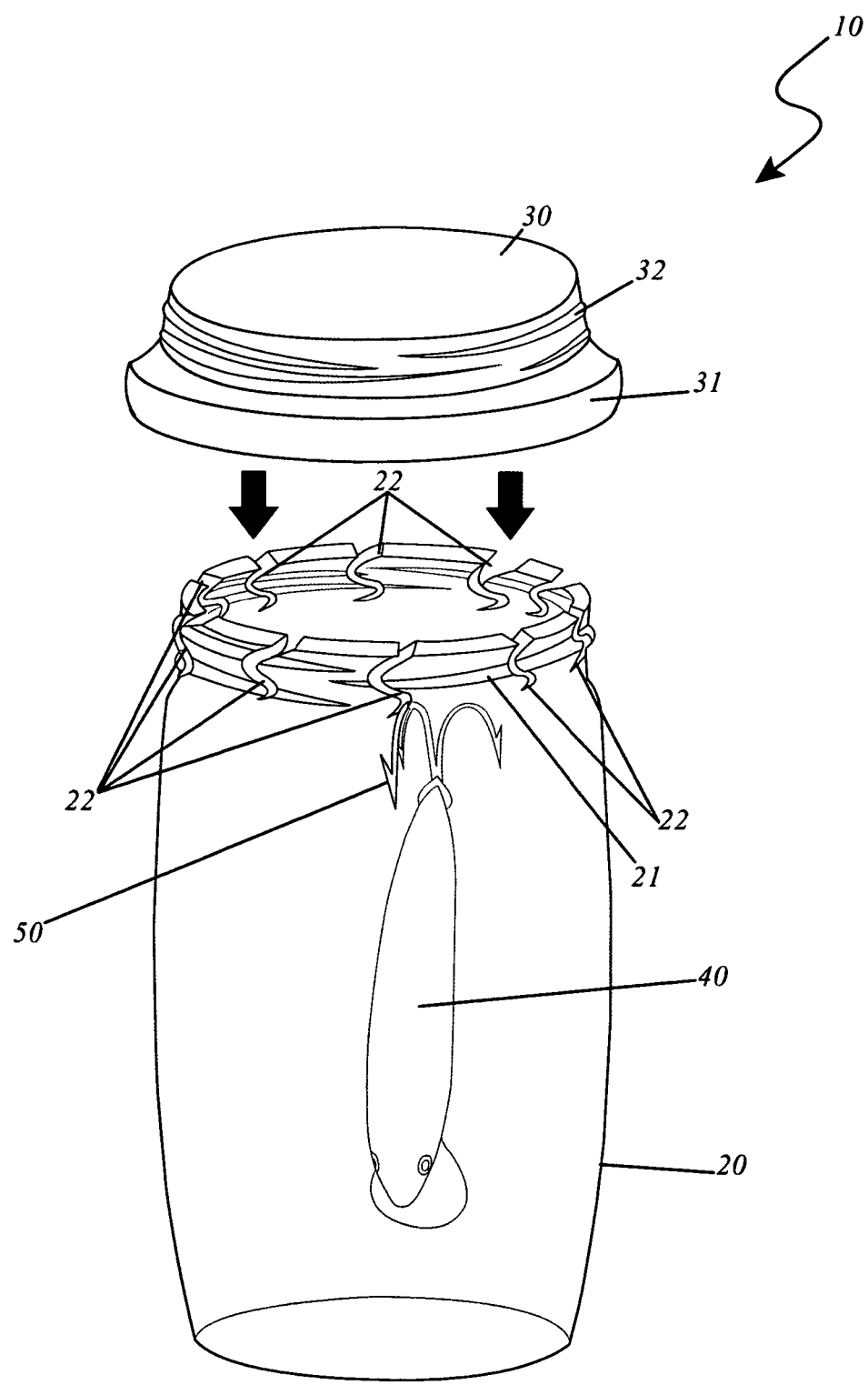
FIG. 1 is a front view of a lure latch device 10, according to a preferred embodiment of the present invention; and, FIG. 2 is a side view of the lure latch device 10, according to a preferred embodiment of the present invention; and, FIG. 3 is a top view of a bottle body 20, according to a preferred embodiment of the present invention; and, FIG. 4 is a close-up view of a lure retention notch 22, according to a preferred embodiment of the present invention; and, FIG. 5 is a top view of a lid 30, according to a preferred embodiment of the present invention.

DESCRIPTIVE KEY 10 lure latch device
20 bottle body
21 threaded opening
22 lure retention notch
30 lid
31 extendable lip
32 lip threads
40 fishing lure
50 hook

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that aids in the safe and convenient storage, display, and transportation of fishing lures 40. The lure latch device (herein described as the "apparatus") 10 comprises a bottle 20, lure retention notches 22, and a novel lid 30. The bottle 20 is envisioned to be fabricated of plastic in an injection molding process. The lure retention notches 22 could be made as part of the injection molding process or could be cut in during a separate process after molding. However, other fabrications of the bottle body 20 could be suitable, preferably of a clear material such as glass so that lures 40, fishing hooks, other tackles, or the like are readily displayed to facilitate selection of the desired lure 40, hooks, tackle, or the like.

Figure 2:
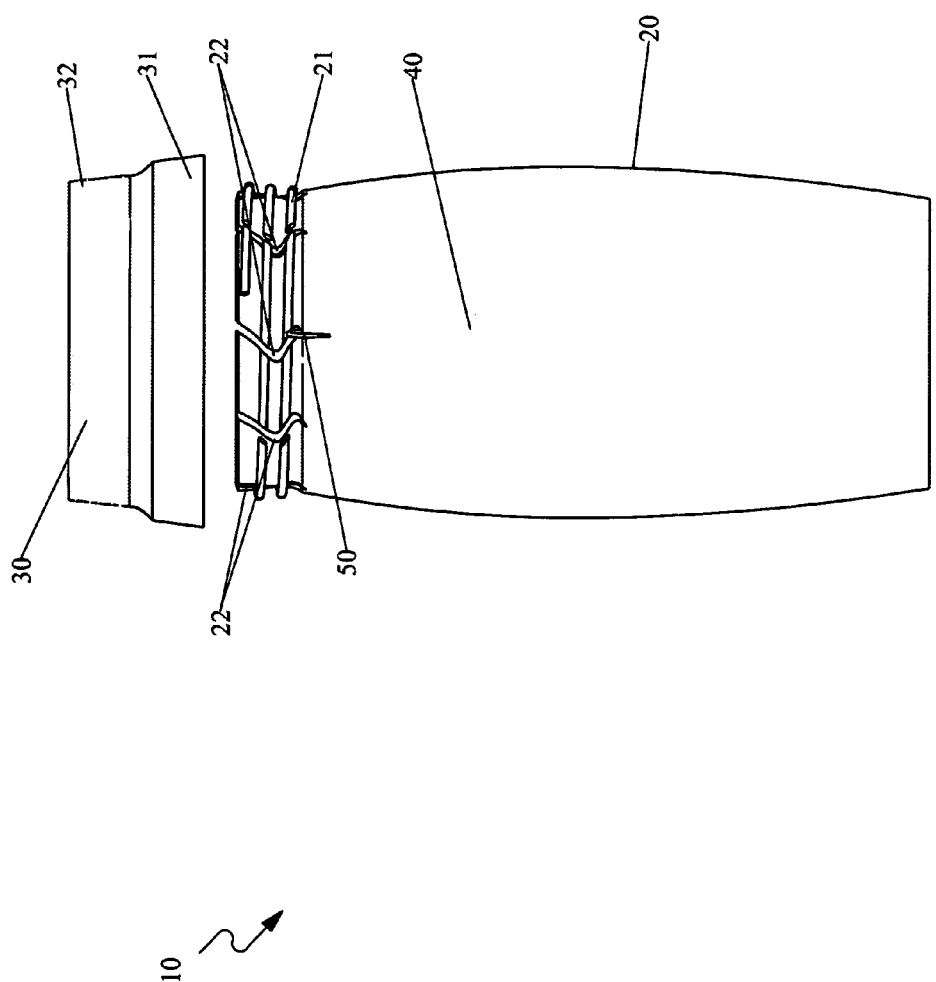
Figure 3:
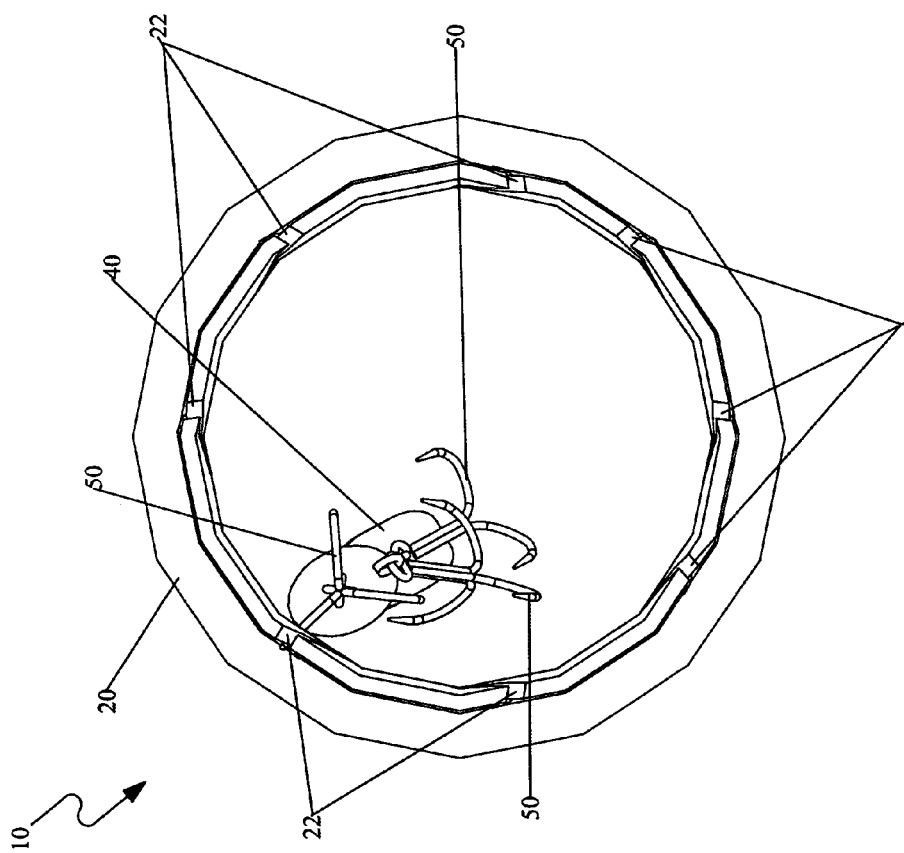

Referring now to FIGS. 1 through 3, views of the apparatus 10 are disclosed in accordance with the preferred embodiment of the present invention. A conventional transparent bottle or jar 20 has a cylindrically shaped body that tapers to a second cylindrical body with an opening. The bottle body 20 is envisioned to be approximately one and one-half (1½) inches in diameter and three and one-half (3½) inches long. However, the size and shape of the bottle 20 may vary in accordance with lure 40 size, amount of lures 40 to be contained therein, and/or other user preferences. The bottle body 20 may comprise a handle at a proximal end thereof in which grips or recessed finger sections shaped to accommodate an average person's hand may be included. The body 20 also defines an interior compartment for housing a plurality of fishing lures 40 with an open front face leading toward said interior compartment. Formed on the outer periphery of the second cylindrical portion are male threads 21 positioned at the upper opening for receiving and cooperating with female threads 32 of the lid 30. Also formed thereupon the outer periphery of the second cylindrical portion is a series of equidistantly-spaced lure retaining notches 22, herein depicted as "S"-shaped notches 22 for purposes of illustration.

Figure 4:
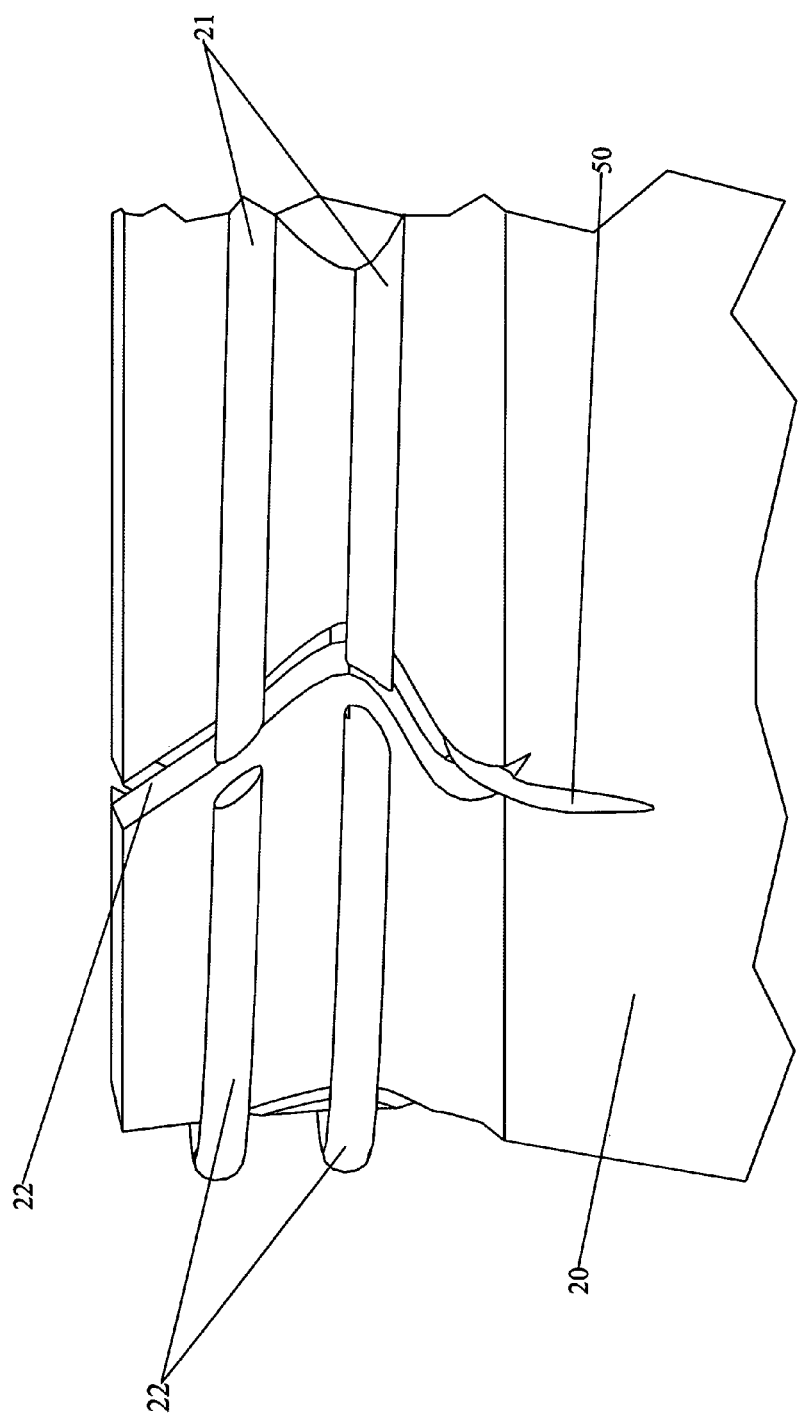

Referring now to FIG. 4, a close-up view of a lure retention notch 22 is disclosed in accordance with the preferred embodiment of the present invention. The bottle 20 is envisioned to comprise six (6) to eight (8) notches 22; however, a plurality of notches 22 of various sizes and shapes in accordance with the hook 50 size, may be utilized without leaving the scope of the invention. The size and shape of each notch 22 may vary depending upon the size of the lure 40 to be contained therein. The notches 22 extend downward past the exterior threads 21 but remain within the second cylindrical portion. The notches 22 are disposed equidistantly at predetermined intervals along the entire periphery of the second cylindrical portion adapted to slidably and removably receive and retain a plurality of lures 40. The shape of the notches 22 provides a way for the fishing lures 40 to be securely retained therewithin said notches 22 by suspending the barbed portion of each fishing lure hook 50 around the curved portions of the "S"-shaped notch 22. As a result, the fishing lures 40 are vertically suspended for quick and easy accessibility.

Figure 5:
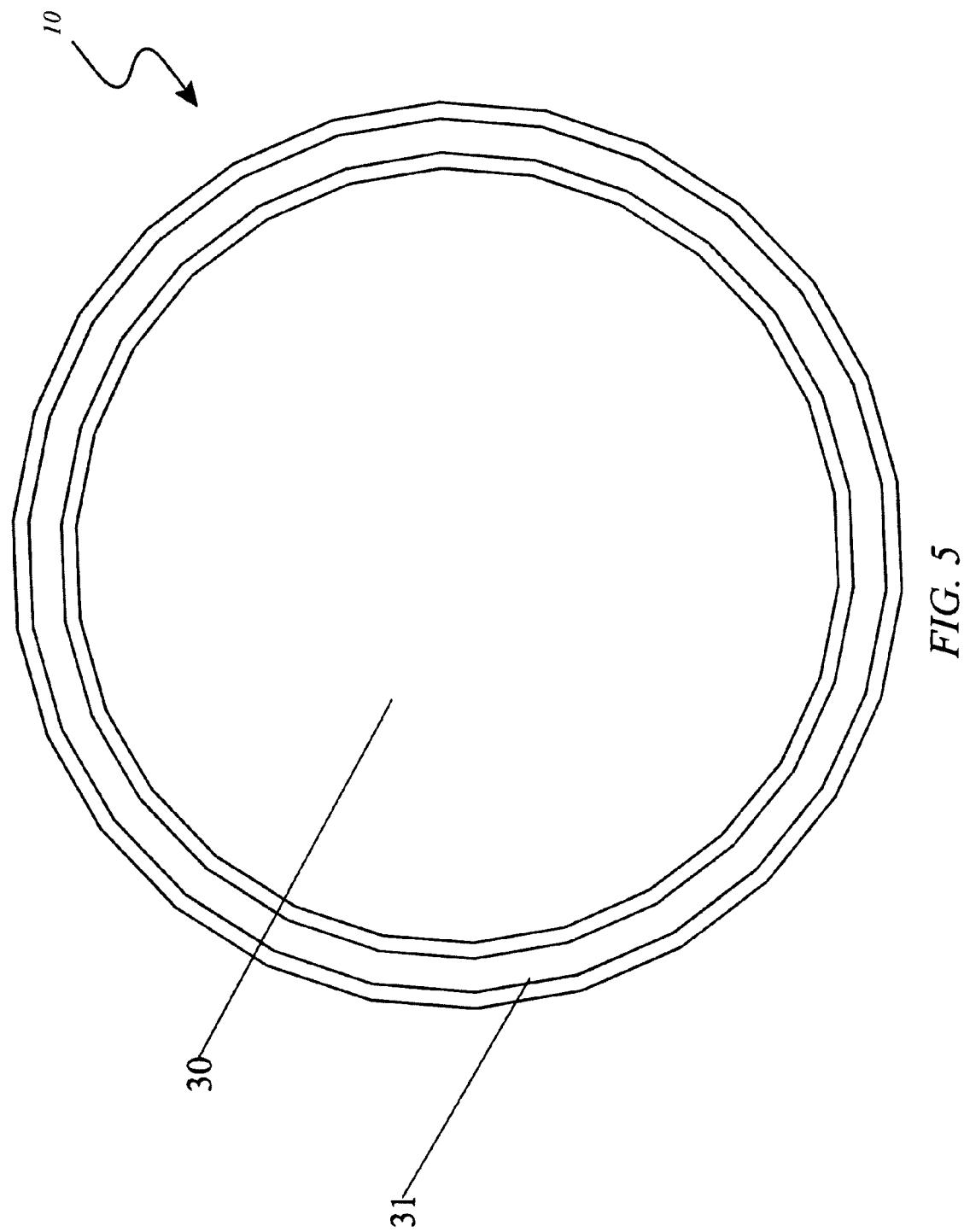

Referring now to FIG. 5, a top view of a lid 30 is disclosed in accordance with the preferred embodiment of the present invention. A lid 30 is also described, with a diameter slightly larger than that of the bottle body 20 proper and with female threads 32 formed on its inner periphery, defining a bore for receiving the male threads 21 of the bottle body 20. The female threads 32 shall match that of the male threads 21 located on the bottle body 20. The lid 30 engages the male threads 21, thereby disposing an extruded lip portion 31 over the hooks 50 of the fishing lures 40. When in the closed position with the lid 30 removably attached thereon, the inner surface of the lid 30 retains the hooks 50 of the lures 40 in a secure arrangement, preventing unwanted movement even during rolling and pitching movements of a boat, or other external movements. The lid 30 has an extruded lip 31 portion to extend outward and depend downward large enough to completely cover the hook 50 of the stored lure 40. When the lid 30 engages the male threads 21 thereby in the closed position, the extruded lip 31 covers the hooks 50 of fishing lures 40 in order to protect against any inadvertent contact with the hooks 50, thereby minimizing injury, entanglement, and/or other unwanted occurrences.

An alternate embodiment of the present invention 10 may provide a means for a fisherman to wear the apparatus 10, utilizing a belt, shoulder strap(s), or the like. Further, the apparatus 10 may also provide a means for the invention to be removably mounted on the side of a boat, dock, pier, or the like.

Another alternate embodiment of the present invention 10 may disclose a lid 30 hingedly coupled thereto the bottle 20, or other attachment means, such to provide access therein the bottle 20.

Yet another alternate embodiment of the present invention 10 may disclose a bottle 30 adapted to hold fishing line, swivels, and weights within said bottle 20, as well as or instead of, fishing lures 40 to provide a small, but dynamic tackle box.

The preferred embodiment of the present invention can be utilized by the common user in a simple and effortless manner, who has little or no training. After initial purchase or acquisition of the apparatus 10, it would be configured as indicated in FIGS. 1 through 5.

The method of utilizing the apparatus 10 may be achieved by performing the following steps: rotatably removing the lid 30 from the bottle 20, thereby opening the apparatus 10; hanging the desired lures 40 by inserting the hooks 50 into the corresponding notches 22; rotatably adjoining the lid 30 therewith the upper portion of the bottle 20 with the lip 31 operably covering the hooks 50 of the lures 40; rotatably removing the lid 30 from the bottle 20 thereby opening the apparatus 10 for the removal of the lure 40 from the corresponding notch 22, if desired; and rotatably adjoining the lid 30 therewith the upper portion of the bottle 20.

The main function of the lure latch 10 allows the user to store, display, and transport their fishing lures 40 in one convenient apparatus 10 in a tangle-free manner without damaging the colorful, decorative lure 40 and fly portion thereof. Upon initial inspection, the apparatus 10 is similar to a glass or plastic medicine bottle, complete with a transparent body 20 and threadably detachable lid 30. A plurality of "S"-shaped notches 22, each spaced equidistant from each other about the periphery of the bottle 20 opening, retains conventional fishing lures 40, which are suspended via hooks 50 from these "S"-shaped notches 22, which are shaped such that they can be easily and securely retained. The user, after securing the hooks 50 of the fishing lures 40 in the notches 22, may then reattach the lid 30 to the bottle body 20, ensuring the extruded lip 31 portion of the lid 30 depends downward far enough to cover said hook 50, thus securing the lures 40 within the bottle 20. The lip 31 completely encloses the barbs of the hook 50 outside of the bottle 20, thereby preventing accidental engagement of the hooks 50 with a person or any other object. The fishing lures 40 are then able to be stored, displayed, and transported according to the desires of the user.

The apparatus 10 is envisioned to vary in size depending upon the size of the lures 40, hooks, tackle, or other items to be transported and stored therein. The apparatus 10 is not only utilized for the easy transportation and selection of the desired lures 40 by keeping said lures 40 separated and apart, but also provides safety in the transport, storage, and handling of the lures 40 securely housed in individual notches 22. The apparatus 10 is envisioned to be fabricated of a transparent or translucent material to permit visibility of the fishing lures 40 mounted therein. The bottle 20 of the present invention 10 comprises an upper portion having a plurality of notches 22 associated with said upper portion. The bottle 20 comprises a lid 30, which is rotatably removed and raised to expose and remove or add the desired lures 40. To insert and remove lures 40, the hooks 50 of the lures 40 are simply slidably inserted and removed around the curves of the "S"-shaped notches 22. The notches 22 are spaced at a distance from each other in order to allow the fishing lure 40 to be easily grasped and removed from its retained position.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A lure latching system for storing, displaying and transporting lures comprising:
    a first transparent cylindrically-shaped container with a first diameter tapering to a second diameter with an opening, said second diameter having a fastening mechanism on an outer periphery;
    a plurality of equidistantly-spaced lure-retaining notches extending downwardly through said fastening mechanism within said second diameter; said equidistantly-spaced lure-retaining notches configured to receive at least one hook-suspended lure; and,
    a closure with a diameter larger than said cylindrically-shaped container and having a fastening mechanism therein capable of coupling to said fastening mechanism of said second diameter of said cylindrically-shaped container thereby covering said cylindrically-shaped container and storing and displaying said lures;
    wherein said closure further comprises a lip portion that extends outward and depends downward from said container when said closure is coupled to said container in order to cover and protect said hooks of said lures from accidental damage to an object or injury to a person.

2. The system of claim 1, wherein said lure-retaining notches further comprise a serpentine shape.

3. A method of retaining and displaying at least one fishing lure with a hook, comprising the steps of:
    providing a lure latching system for storing, displaying and transporting lures, further comprising:
        a first transparent cylindrically-shaped container with a first diameter tapering to a second diameter with an opening, said second diameter having a fastening mechanism on an outer periphery;
        a plurality of equidistantly-spaced serpentine-shaped lure-retaining notches extending downwardly through said fastening mechanism within said second diameter; said equidistantly-spaced lure-retaining notches configured to receive at least one hook-suspending lures; and,
        a closure with a diameter larger than said cylindrically-shaped container and having a fastening mechanism therein capable of coupling to said fastening mechanism of said second diameter of said cylindrically-shaped container thereby covering said cylindrically-shaped container and storing and displaying said lures;
    securing said hook of said lure within said lure-retaining notches by slidingly inserting said hook of said lure around said serpentine-shaped notches such that said lure is retained within said cylindrically-shaped container and said hook extends outward from said container; and,
    fastening said closure on said second diameter of said cylindrically-shaped container via said fastening mechanism, thereby securing said lures within said cylindrically-shaped container.

4. The method of claim 3, further comprising the step of providing a closure comprising a lip portion that extends outward and depends downward from said cylindrically-shaped container when said closure is coupled to said cylindrically-shaped container in order to cover and protect said hooks of said lures from accidental damage to an object or injury to a person.

* * * * *